(12) United States Patent
Adoline et al.

(10) Patent No.: US 7,387,181 B2
(45) Date of Patent: Jun. 17, 2008

(54) HOOD LIFT SYSTEM

(75) Inventors: Jack W. Adoline, Toledo, OH (US); Mark R. Thomas, Toledo, OH (US); Phillip A. McConnell, Swanton, OH (US); Thomas J. Fischer, Whitehouse, OH (US)

(73) Assignee: Associated Spring Raymond, Maumee, OH (US)

( * ) Notice: Subject to any disclaimer, the term of this patent is extended or adjusted under 35 U.S.C. 154(b) by 0 days.

(21) Appl. No.: 10/958,004

(22) Filed: Oct. 4, 2004

(65) Prior Publication Data

US 2006/0070832 A1 Apr. 6, 2006

(51) Int. Cl.
*B62D 25/10* (2006.01)

(52) U.S. Cl. .................. 180/69.21; 267/195

(58) Field of Classification Search ............ 180/69.21, 180/69.2; 280/220, 283, 775, 763.1; 188/129, 188/282.1, 284; 267/290, 286, 131, 118, 267/195, 203, 64.12; 248/408, 407
See application file for complete search history.

(56) References Cited

U.S. PATENT DOCUMENTS

| | | | | |
|---|---|---|---|---|
| 571,972 A | | 11/1896 | Janney | |
| 1,267,532 A | * | 5/1918 | Flentie | 188/284 |
| 1,329,561 A | * | 2/1920 | Thompson | 267/290 |
| 1,445,615 A | * | 2/1923 | Ferres | 188/284 |
| 1,727,430 A | * | 9/1929 | Gilkison | 280/763.1 |
| 2,117,837 A | * | 5/1938 | Casper | 188/284 |
| 2,705,634 A | * | 4/1955 | Sampson et al. | 267/203 |
| 2,735,132 A | * | 2/1956 | Wartian | 188/284 |
| 2,916,281 A | * | 12/1959 | Hehn | 188/284 |
| 2,948,529 A | | 8/1960 | Maier | |
| 2,981,552 A | * | 4/1961 | Rutigliano | 280/763.1 |
| 3,131,921 A | | 5/1964 | Karbowniczek | |
| 3,643,907 A | * | 2/1972 | Ham | 280/763.1 |
| 3,758,092 A | * | 9/1973 | McGregor | 267/131 |
| 3,782,710 A | * | 1/1974 | Selke et al. | 267/118 |
| 3,977,712 A | | 8/1976 | Northrop | |
| RE29,545 E | | 2/1978 | Deisenroth | |
| 4,126,302 A | | 11/1978 | Curnutt | |
| 4,162,062 A | | 7/1979 | Strauss | |
| 4,274,515 A | | 6/1981 | Bourcier de Carbon | |
| 4,328,960 A | * | 5/1982 | Handke et al. | 188/284 |
| 4,651,979 A | | 3/1987 | Freitag | |
| 4,693,343 A | | 9/1987 | Boyd | |
| 4,807,855 A | * | 2/1989 | Schuitema | 267/64.12 |
| 4,884,842 A | * | 12/1989 | Finkelstein | 297/331 |
| 4,962,916 A | | 10/1990 | Palinkas | |
| 4,991,675 A | | 2/1991 | Tosconi et al. | |
| 5,014,004 A | | 5/1991 | Kreibich | |

(Continued)

FOREIGN PATENT DOCUMENTS

DE 2461838 6/1976

(Continued)

*Primary Examiner*—Hau V Phan
(74) *Attorney, Agent, or Firm*—Fay Sharpe LLP; Brian E. Turung

(57) ABSTRACT

A strut assembly having first and second mounting members extending from opposite ends of the housing for mounting the strut assembly to a hood assembly. A locking member is connected to the housing and slides into locking engagement with the rod member. Restraining members are secured to the mounting members to prevent unwanted travel of the hood assembly beyond a fully opened position.

40 Claims, 12 Drawing Sheets

U.S. PATENT DOCUMENTS

| | | | |
|---|---|---|---|
| 5,044,592 A * | 9/1991 | Cienfuegos | 248/408 |
| 5,094,424 A * | 3/1992 | Hartway | 280/220 |
| 5,095,581 A * | 3/1992 | Sarto | 188/284 |
| 5,104,144 A * | 4/1992 | Bethell | 188/284 |
| 5,131,512 A * | 7/1992 | Steinhilber et al. | 188/284 |
| 5,219,414 A * | 6/1993 | Yamaoka | 188/284 |
| 5,291,974 A | 3/1994 | Bianchi | |
| 5,360,123 A | 11/1994 | Johnston | |
| 5,368,141 A * | 11/1994 | Clarke | 188/284 |
| 5,482,261 A | 1/1996 | Ortega | |
| 5,511,868 A | 4/1996 | Eftefield | |
| 5,620,066 A | 4/1997 | Schuttler | |
| 5,667,041 A * | 9/1997 | Jensen | 188/284 |
| 5,728,174 A | 3/1998 | Fitzlaff | |
| 5,730,239 A | 3/1998 | Holter | |
| 5,799,759 A | 9/1998 | Koch | |
| 5,810,339 A | 9/1998 | Kuspert et al. | |
| 5,887,857 A | 3/1999 | Perrin | |
| 5,890,556 A | 4/1999 | Shearn et al. | |
| 5,946,946 A | 9/1999 | Sharp | |
| 5,975,228 A * | 11/1999 | Parfitt | 180/69.21 |
| 5,984,058 A | 11/1999 | Danneker | |
| 6,026,755 A | 2/2000 | Long | |
| 6,179,099 B1 | 1/2001 | Koch | |
| 6,199,843 B1 | 3/2001 | DeGrace | |
| 6,202,971 B1 * | 3/2001 | Duncan | 248/407 |
| 6,220,406 B1 | 4/2001 | DeMolina et al. | |
| 6,354,557 B1 * | 3/2002 | Walsh | 248/408 |
| 6,443,271 B2 * | 9/2002 | Schmidt | 188/284 |
| 6,673,002 B2 | 1/2004 | Trovinger et al. | |
| 6,691,840 B1 * | 2/2004 | Lisenker et al. | 188/284 |
| 6,773,003 B2 | 8/2004 | Dermody, Jr. | |
| 7,025,522 B2 * | 4/2006 | Sicz et al. | 248/408 |
| 2004/0104566 A1 * | 6/2004 | Adoline et al. | 280/775 |
| 2004/0113341 A1 * | 6/2004 | McConnell et al. | 267/195 |

FOREIGN PATENT DOCUMENTS

| | | |
|---|---|---|
| DE | 2722884 | 11/1978 |
| DE | 2722884 A1 | 6/1980 |
| DE | 3716205 A1 | 11/1987 |
| DE | 3716205 C2 | 11/1987 |
| DE | 393 9118 | 5/1991 |
| DE | 3989118 C2 | 5/1991 |
| DE | 19 504961 | 8/1998 |
| DE | 200 00940 | 5/2000 |
| GB | 2036247 A | 6/1980 |
| JP | 5 705934 | 1/1982 |

* cited by examiner

HOOD LIFT SYSTEM

BACKGROUND OF THE INVENTION

The present invention relates to strut assemblies, and more particularly, to a compression strut rod assembly used to lift a vehicle hood and to secure the hood into place in a fully opened position.

One aspect of the invention relates to a spring mechanism typically used for biasing hoods, tops, doors, hinged covers, and other elements from a closed to an opened position. The invention involves the use of springs in conjunction with a rod member to exert a driving force on the elements to be displaced. The following patents are incorporated herein by reference as background information with regard to spring mechanisms: U.S. Pat. No. 6,199,843 to DeGrace; U.S. Pat. No. 5,810,339 to Küspert, et al.; and U.S. Pat. No. 4,962,916 to Palinkas.

Compression spring rods are used in various applications; for example, to assist in lifting, opening, and damping. Typical applications include lifting a lid hinged to a stationary base. Other applications include lifting and/or balancing elements for a trunk or hood of an automobile. The present invention uses the compression spring rod assembly to assist a hood of a vehicle during opening of the hood and securing the hood in place in a fully opened position.

Gas can also be used with the strut assembly. Either gas alone or gas in combination with a spring or springs can be used to lift a vehicle hood.

Existing mechanical lifts for hoods can require greater than 100 pounds of force to open or close a hood. A strut is used to assist in over-center body locking of the hood only. Variations in handle loads occur due to variations in torsion bar forces. Since the handle loads vary, this can result in the hood falling, possibly causing an under the hood injury to a user.

Existing hood lift systems include nylon tie straps secured by brackets to the hood and radiator. Torsion bars are mounted via hood brackets and frame mounts. This can result in lateral loads on the radiator which causes related radiator stress.

Prior systems also utilize a unidirectional counter-balance which assists in opening only the hood. A variation in handle loads occurs due to a variation in torsion bar forces, resulting in increased handle loads. No device to secure the hood in an open position is present, resulting in a potential for unintended closing of the hood.

Furthermore, since there is no contact handle load, the hood can potentially free fall, resulting in possible injury to the user.

Failure of extension springs and oil dampeners in existing systems can cause greater handle loads, hard closing of the hood, and/or additional parts replacement.

In some existing systems, foiled back insulation can wear due to contact with large extension springs. A pinch point can also occur between the handle and a dampener mount, causing potential injury to the user.

Thus, there is need for a hood lift system which overcomes the above-mentioned defects and others while providing more advantageous overall results.

SUMMARY OF THE INVENTION

The present invention provides an improved strut assembly which overcomes the above referred to difficulties and others with regard to such assemblies heretofore available.

The present invention relates to a hood lift system which requires no more than 30 pounds of force to open or close the hood. A bidirectional lift assist allows controlled lift while the hood mount goes from positive to negative. The present system eliminates lateral loading on the radiator which in turn removes related radiator stress. Potential failure modes are minimized and hood safety concerns are minimized by hood loads being closely balanced.

According to one aspect of the present invention, a strut assembly includes a compression spring rod assembly with a housing having a longitudinal axis and axially opposite ends. A rod member is coaxial with the axis and has an inner end in the housing and an outer end axially outwardly of one of the opposite ends.

A guide member is provided on an inner end of the rod member for supporting the rod member during movement of the rod member. A first spring assembly extends between one of the opposite ends of the housing and the guide member. A second spring assembly extends between the other of the opposite ends of the housing and the guide member.

First and second mounting members extend from opposite ends of the housing for mounting the strut rod assembly to a hood assembly. A locking member is connected to the housing and slides into locking engagement with the rod member.

In accordance with another aspect of the present invention, a hood lift assembly comprises a hood pivotably mounted to a vehicle, and a strut. The strut has a housing having a longitudinal axis and axially opposite ends, and a rod member coaxial with the axis and having an inner end in the housing and an outer end axially outwardly of one of the opposite ends.

A first stage spring assembly extends along the longitudinal axis of the housing. A second stage spring assembly extends between an end of the first stage spring assembly and an end of the housing.

A first mounting member connects to the outer end of the rod member for securing the strut assembly to a vehicle body. A second mounting member connects to an end of the housing for securing the strut assembly to the hood.

In accordance with another embodiment of the present invention, a hood lift assembly has a strut assembly with a housing having a longitudinal axis and axially opposite ends. A rod member is coaxial with the axis and has an inner end in the housing and an outer end axially outwardly of one of the opposite ends. A first spring assembly extends between one of the ends of the housing and the guide member, and a second spring assembly extends between the guide member and the other of the ends of the housing. A first mounting member secures the strut assembly to an associated hood. A second mounting member secures the strut assembly to an associated vehicle body. A restraining member connects to and extends between the first and second mounting members.

In accordance with yet another embodiment of the present invention, a hood lift assembly comprises a strut assembly. A first mounting member connects to a first end of the strut assembly and to an associated hood assembly. A second mounting member connects to a second end of the strut assembly and to an associated vehicle body wherein the first mounting member moves when the associated hood assembly is moved from a closed to an open position. The second mounting member is stationary when the associated hood is moved from a closed to an open position. The strut assembly can include springs, gas only, or gas and springs in combination.

One aspect of the present invention is that the hood lift system provides consistent and accurate loads.

Another aspect of the present invention is that the hood lift system is not sensitive to temperature or harsh environments.

Yet another aspect of the present invention is that it is essentially corrosion resistant.

Still another aspect of the present invention is that it is provided with durable end bearings.

Still another aspect of the present invention is that it is provided with a permanently enclosed body.

Still other aspects of the present invention will become apparent to those of ordinary skill in the art upon reading the following detailed description of the preferred embodiment.

BRIEF DESCRIPTION OF THE DRAWINGS

The foregoing and other objects and advantages will in part be obvious and in part pointed out in the following description taken together with the accompanying drawings in which.

DETAILED DESCRIPTION OF THE PREFERRED EMBODIMENTS OF THE INVENTION

Figure 1:
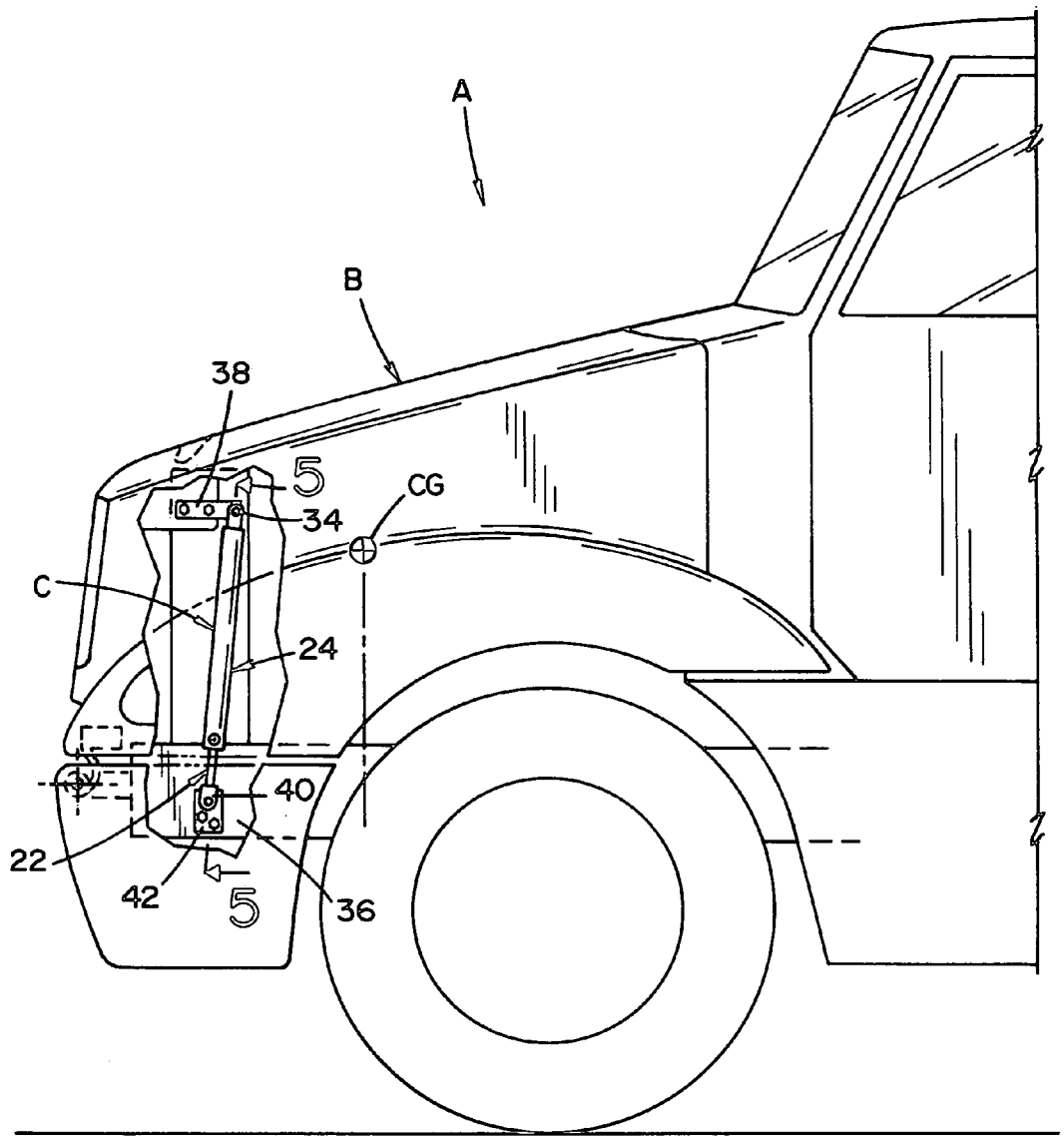
FIG. 1 shows a side elevation view of a vehicle hood and a compression strut assembly in a fully closed position according to a preferred embodiment of the present invention.
Figure 2:
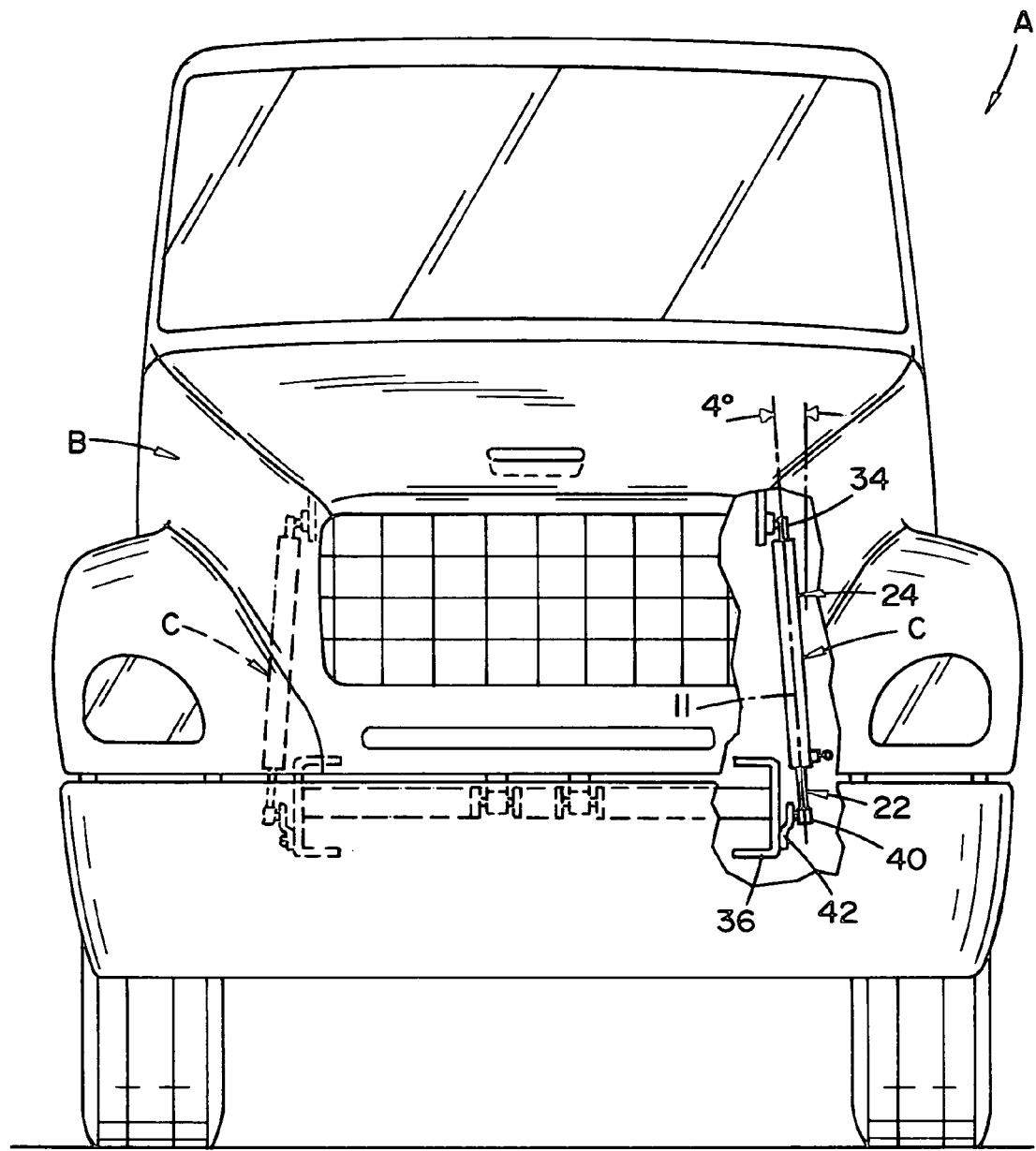
FIG. 2 is a front elevational view of the vehicle hood and the compression strut assembly of FIG. 1 (shown in breakaway view) and another compression strut assembly (shown in dotted lines) mounted on an opposite side of the hood, where the hood is in a closed configuration.

Referring now in greater detail to the drawings, wherein the showings are for the purpose of illustrating preferred embodiments of the invention only, and not for the purpose of limiting the invention, FIG. 1 shows a front section of a vehicle A, such as a truck or car, with a downwardly sloped or angled hood B pivotally connected to the vehicle having a strut assembly C attached thereto. FIG. 1 illustrates the hood and the strut assembly in the fully closed and secured position. FIG. 2 illustrates the front of the truck and the hood and strut assembly in a fully closed position. A second strut is shown positioned on an opposite side of the truck.

Figure 3:
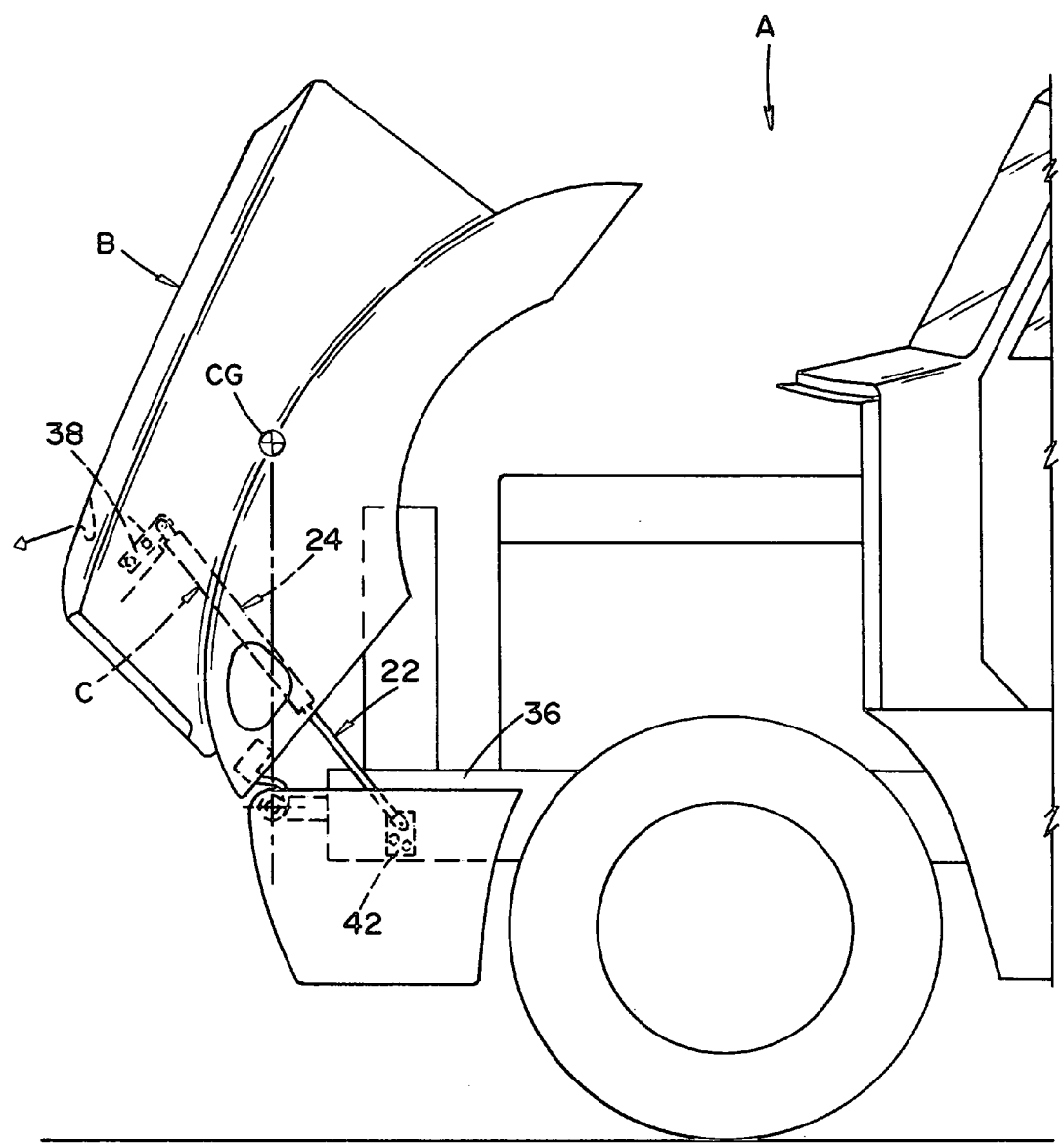
FIG. 3 is a side elevational view of the vehicle hood and compression strut assembly of FIG. 1 in which the hood is in a balanced position over the center of gravity of the hood.

FIG. 3 illustrates the hood B and strut assembly C where the hood is balanced over the center of gravity (CG) of the hood. The hood would then have a tendency to continue traveling in the left hand direction as illustrated by the arrow past the center of gravity to a fully opened position. If the hood's travel is not limited or cushioned, the hood could potentially injure the person who is manually opening the hood. When the hood is in the balanced position over its center of gravity, it is approximately 45 or 46 degrees from vertical.

Figure 4:
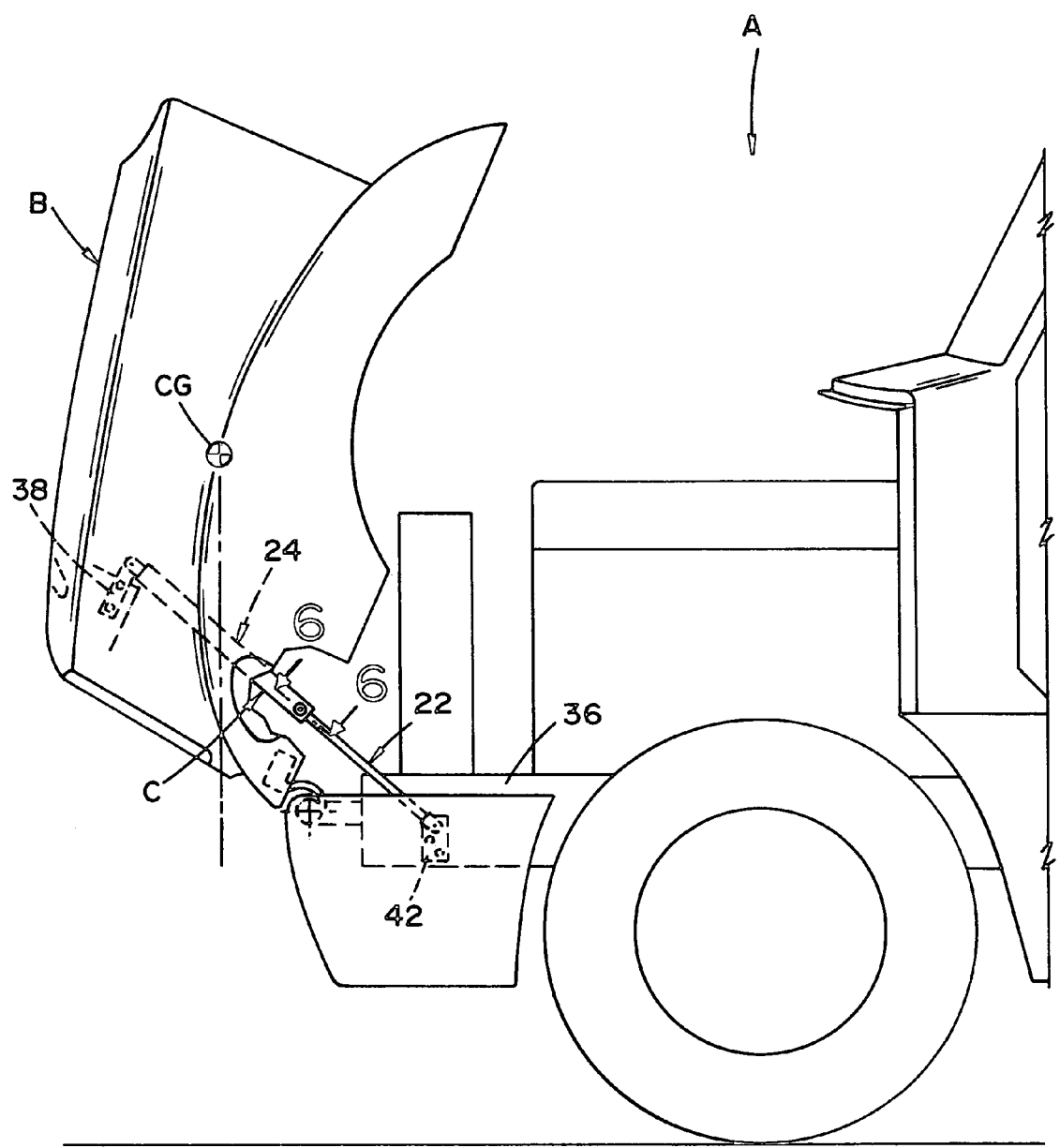
FIG. 4 is a side elevational view of the vehicle hood with the compression strut assembly where the hood is in a fully opened position.

Referring now to FIG. 4, the hood is shown in the fully opened position past the center of gravity in which the strut assembly has cushioned the travel of the hood and prevents further movement back toward the closed position. In the fully opened position the hood is positioned at about 68 degrees from vertical.

Figure 5:
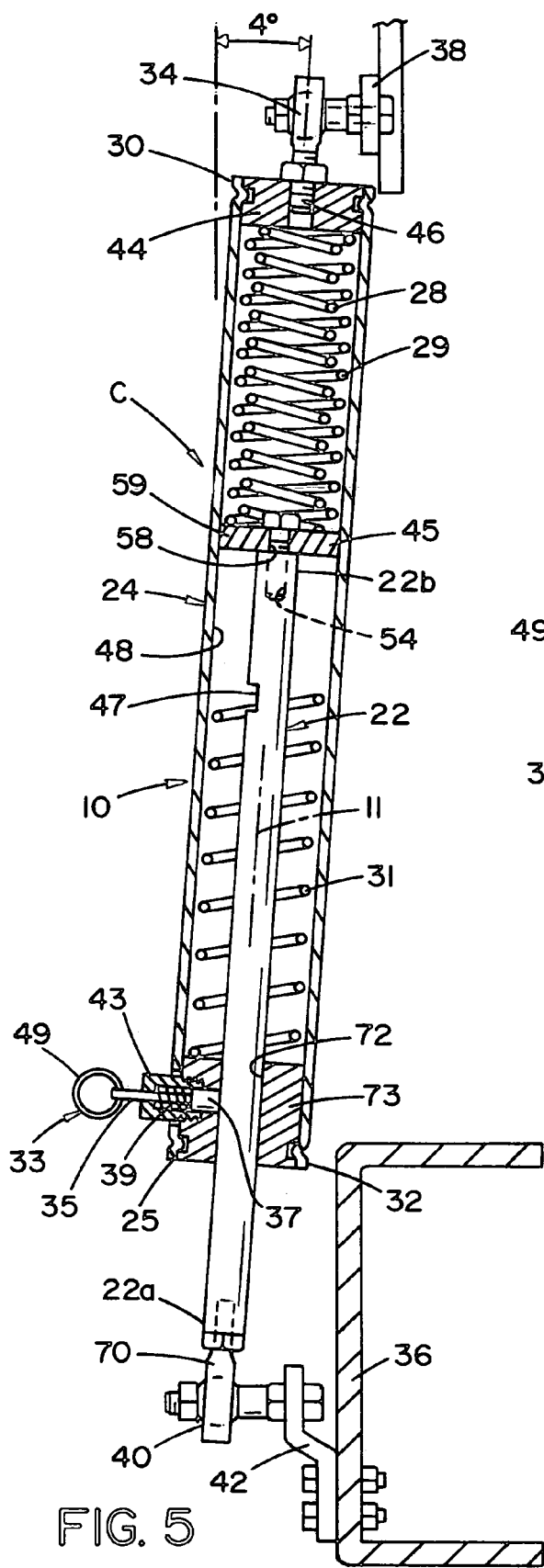
FIG. 5 is a side elevational view of the compression strut assembly shown in cross-section in the fully closed position of FIG. 1.
Figure 6:
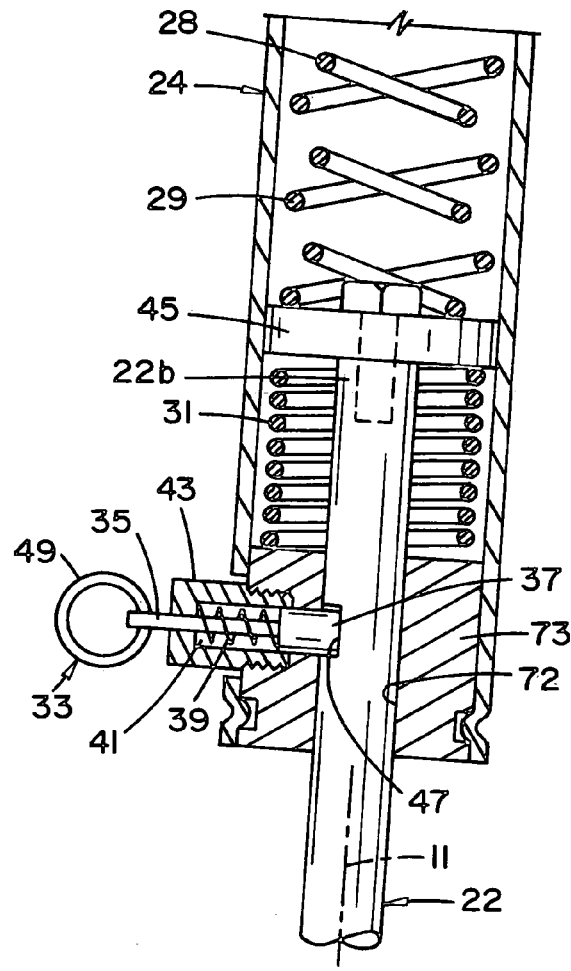
FIG. 6 shows the compression strut assembly in a fully opened position shown in cross section.

Referring now to FIGS. 4, 5, and 6 a strut which has a two stage spring assembly is illustrated which utilizes a first stage spring which is used to open the hood and a second stage spring which is used to prevent the hood from falling after passing the center of gravity point of the hood. The strut assembly C has a compression spring rod 10 with an axis 11 and a rod member 22 which is axially extendable and retractable relative to a one-piece tubular housing 24. The housing 24 has a longitudinal axis and axially opposite ends. Rod 22 has an outer end 22a axially outwardly of one of the opposite ends of the housing and an inner end 22b. In this embodiment, a single spring 31 forms the second stage spring assembly. The compression spring is supported against buckling by interior surface 48 of housing 24. Housing 24 has a first mounting end 30 and a second opposite end 32.

Mounting end 30 is secured to the hood via a bracket 38 and a fastening arrangement such as a ball and socket or toggle arrangement 34 or any other suitable arrangement which allows rotation of the strut. End 22a of the rod member 22 is secured to a lower strut 36 within the vehicle via a ball and socket or toggle mounting arrangement 40 and a bracket 42. First stage compression springs 28, 29 are nested together and are axially captured between a tail bushing 44 at mounting end 30 and a guide member or plug 45 mounted at inner end 22b of rod 22. The springs 28, 29 bias the rod member toward an extended position of the rod member.

The compression spring rod 10 involves the use of a one-piece housing 24 which facilitates smooth movement of rod 22 and compression springs 28, 29 during operation of the spring rod. Tail bushing 44 has a threaded stud 46 which is received in a threaded recess in the bushing. Rod 22 includes a threaded stud 52 which passes through an opening 58 of guide member 59 and into a threaded bore 54 provided in the rod 22. Rod 22 passes through an opening 72 through rod bushing 73 at outer end 25 of housing 24, and has a member 70 on outer end 22a thereof which forms mounting element 40.

Guide member or plug 45 is slidable in the housing 24 and can include a guide ring of suitable material to facilitate such sliding movement. Rod 22 is slidably supported at end 25 of housing 24 by rod bushing 73 which can be secured to the housing by a pair of set screws or other suitable fasteners having inner ends received in an annular recess in the rod bushing. Guide member 45 and the rod bushing support the rod 22 for reciprocation in housing 24 between extended and retracted positions to maintain minimal breakaway forces for rod 22. Additionally, the guide member and the rod bushing keep rod 22 coaxial with axis 11 and decrease the effect of sideloading on the assembly.

The compression spring rod 10 through the spring-like characteristics of the compression springs 28, 29 serves to provide smooth extension forces to the movement of lift rod 22 from a retracted to an extended position thereof relative to housing 24. Depending on the application, the appropriate load versus deflection can be determined and the corresponding physical elastic properties of the combination of the compression springs 28, 29 can then be ascertained. The compression springs can be fabricated from suitable spring material, such as music wire, and for example ASTM A228 or 302 stainless steel. The springs are captured between bushing 44 and plug 59. FIGS. 1 and 5 illustrate the first stage spring assembly in the compressed configuration.

Referring now to FIGS. 4 and 6, the second stage spring assembly which is used to cushion the movement of the hood to the fully opened position, includes a single spring 31 which is positioned between guide plug 45 and bushing 73. As seen in FIG. 5, spring 31 is in the fully relaxed and extended position when the hood is in the fully closed position. FIGS. 5 and 6 also show a locking member 33 in the form of a spring-loaded pin having a first part 35 and a second part 37 wherein the second part has a greater outer diameter than the first part. The locking member further has a spring 39 captured between an end of the second part and a recess 41 formed in a housing 43 which encloses the locking pin. The housing 43 can be threaded or otherwise secured into an opening in bushing 73. The pin second member is received by a groove or recess 47 formed in the rod member, as shown in FIG. 6. Handle or ring 49 is pulled away from housing 24 allowing the spring 39 to compress and the pin to be retracted from the rod as it passes through bushing 73. As the hood is opened, spring 31 is compressed and the rod extends further through the bushing until spring 31 is substantially compressed and the pin engages groove 47 of the rod as shown in FIG. 6. This further prevents the hood from traveling any further than the fully opened position shown in FIGS. 4 and 6.

Referring to FIGS. 5 and 6, the compression spring rod two stage assembly is schematically illustrated in the fully closed and fully opened positions. Referring to FIG. 5, the first stage compression spring assembly which comprises springs 28, 29 is shown to be in the compressed configuration. Second stage spring assembly 31 is shown to be in the fully extended or relaxed position. This configuration of the spring rod assembly corresponds to the hood in the fully closed position as shown in FIG. 1.

As the hood is partially opened as illustrated in FIG. 3, the compression spring first stage spring assembly extends until the hood is in the balanced position over its center of gravity. At this point, the second stage spring is still not contacting the guide plug or piston 45. As soon as the hood extends past the center of gravity, gravity would tend to pull the hood downwardly and cause it to drop or fall in a rapid manner. To avoid this, the second stage spring 31 begins to be compressed by the guide plug 45 as seen in FIG. 6, thus slowing down the speed of movement of the hood to the fully opened position. In this configuration, the first stage spring assembly is in a fully extended position. The rod 22 extends further until pin 33 engages groove 47 and the rod and hood cannot travel beyond the fully opened position. Engagement of the pin thus prevents backward movement or movement of the hood back to a closed position. The pin has to be manually disengaged from the end of the bushing by pulling on the ring or handle 49 and held out of contact with the rod to allow the backward travel of the hood from the fully opened position to a fully closed or partially closed position. The pin rides along the outside edge of the rod as the rod moves through the bushing.

Alternately, a single spring would be used for the first stage spring assembly and a pair of nested springs could be used for the second stage spring assembly.

Figure 7:
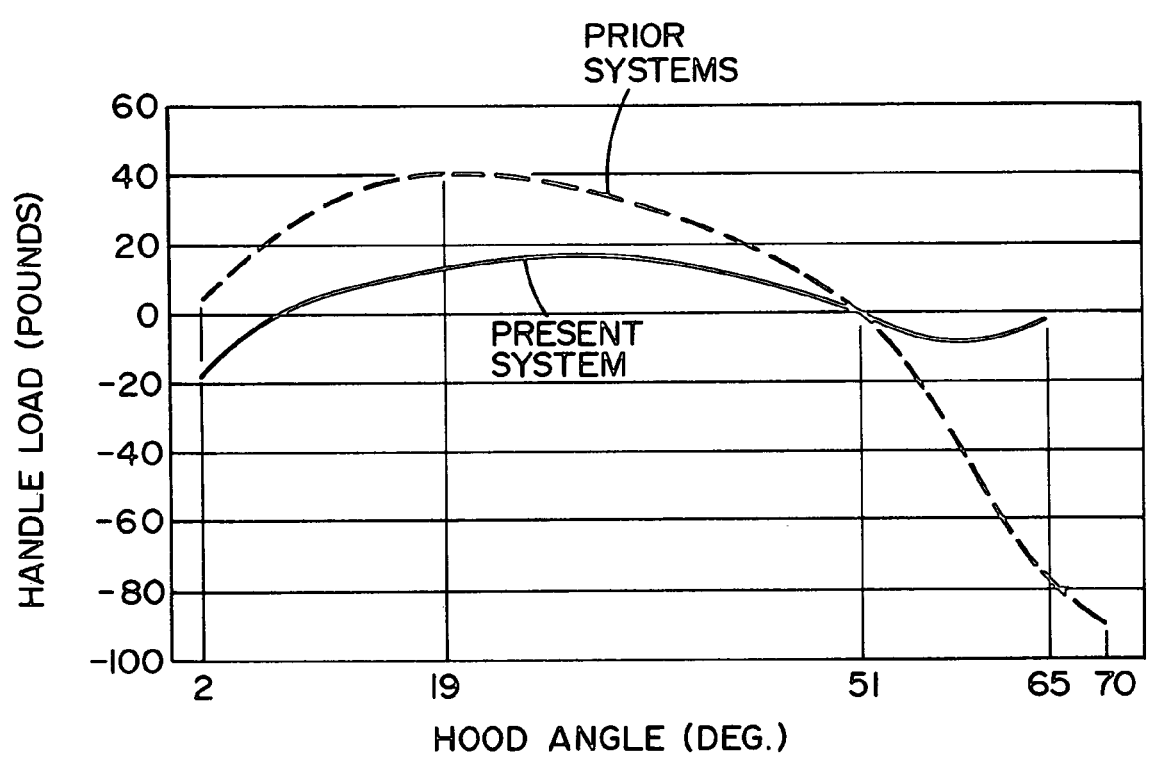
FIG. 7 is a chart illustrating the amount of handle load required to open an close the hood versus the hood angle for the hood lift system of FIG. 1.

Referring now to FIG. 7, a chart is provided which illustrates the handle load required to move the hood versus the angle of the hood. As seen in FIG. 7, existing hood assist systems require up to 40 lbs. of load to lift the hood 19 degrees from vertical. The amount of load changes to −80 lbs. for when the load is 65 degrees from vertical or in the fully opened position. In contrast, the present system requires essentially no handle load to maintain the hood in the opened position. Thus, the present system requires less than 30 lbs. of force to open or close the hood, as compared to 100 lbs. in prior systems.

Figure 13:
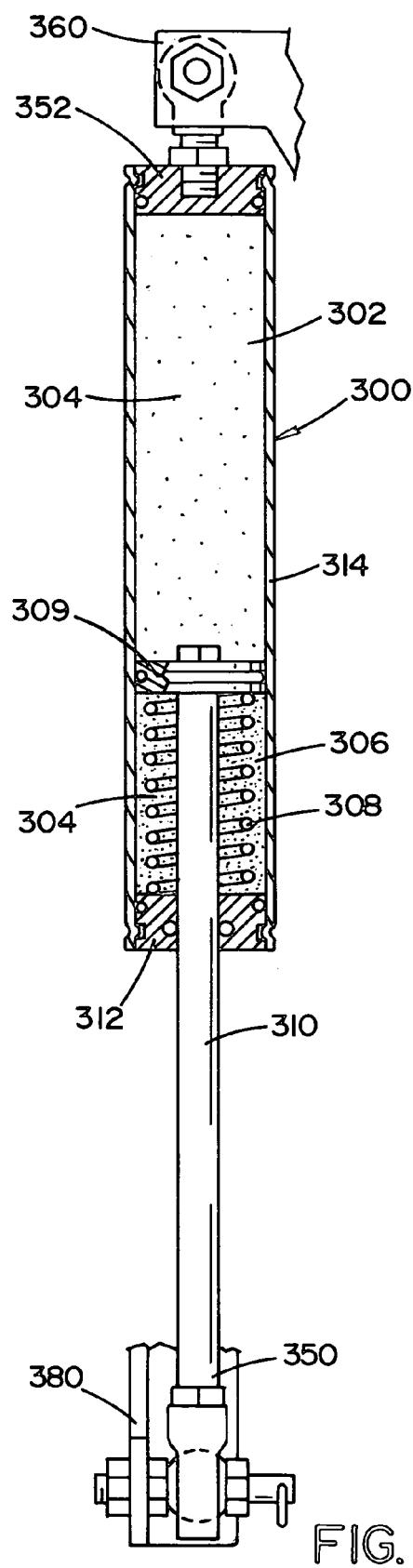
FIG. 13 is a side elevational view of a gas and spring strut assembly in accordance with another embodiment of the present invention.
Figure 14:
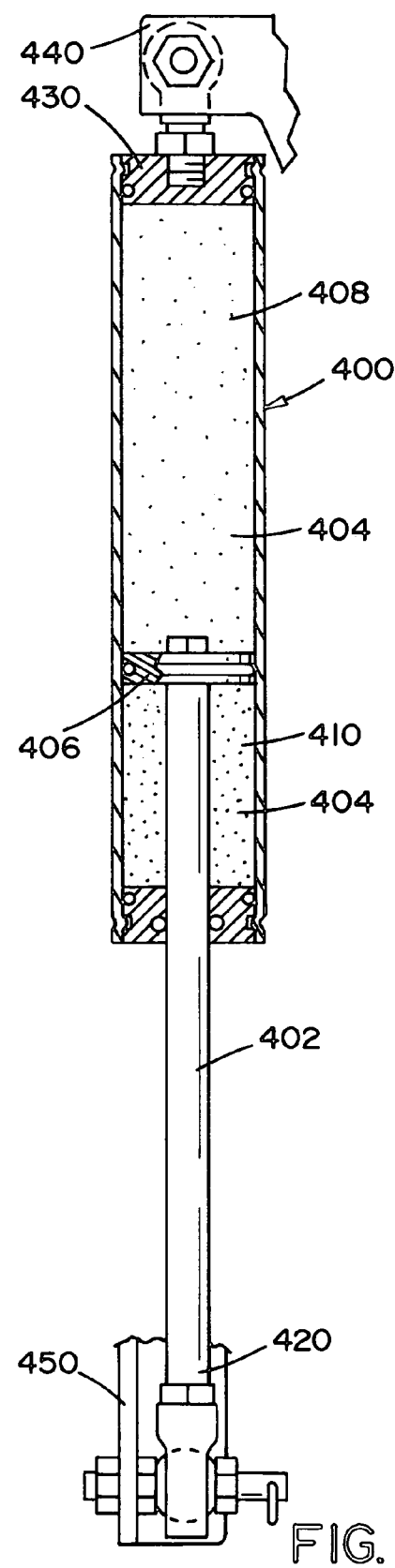
FIG. 14 is a side elevational view of a gas only strut assembly in accordance with yet another preferred embodiment of the invention.

Alternately, a gas or hydraulic strut could be used with the assembly of FIGS. 5 and 6 in lieu of first stage and second stage spring assemblies. That is, a gas strut can be used for the first stage in combination with a second stage spring, or a first stage spring can be used with a second stage gas assembly, or gas can be used for the first and second stage chambers. The gas can be pressurized gas or hydraulic fluid. The strut assembly would include a piston rod and a piston as shown in FIGS. 13 and 14 and explained below. The piston divides the housing into two separate chambers. The operation of a gas strut is well known and will not be described in detail here. An example of a hydraulic strut is disclosed in U.S. Pat. No. 5,799,759.

Referring now to FIGS. 8-11, an alternate embodiment of the strut assembly is illustrated. The compression spring rod assembly is substantially as described for FIGS. 1 and 6. In this embodiment, however, the first stage spring assembly has two nested springs 101, 103 and a second stage spring is a single spring 105 housed within housing 100. Furthermore, in this embodiment, in the hood fully closed position shown in FIGS. 8 and 10, rod assembly 107 is in the extended position. In the hood opened position, shown in FIG. 9, the rod is in the retracted position.

Figure 8:
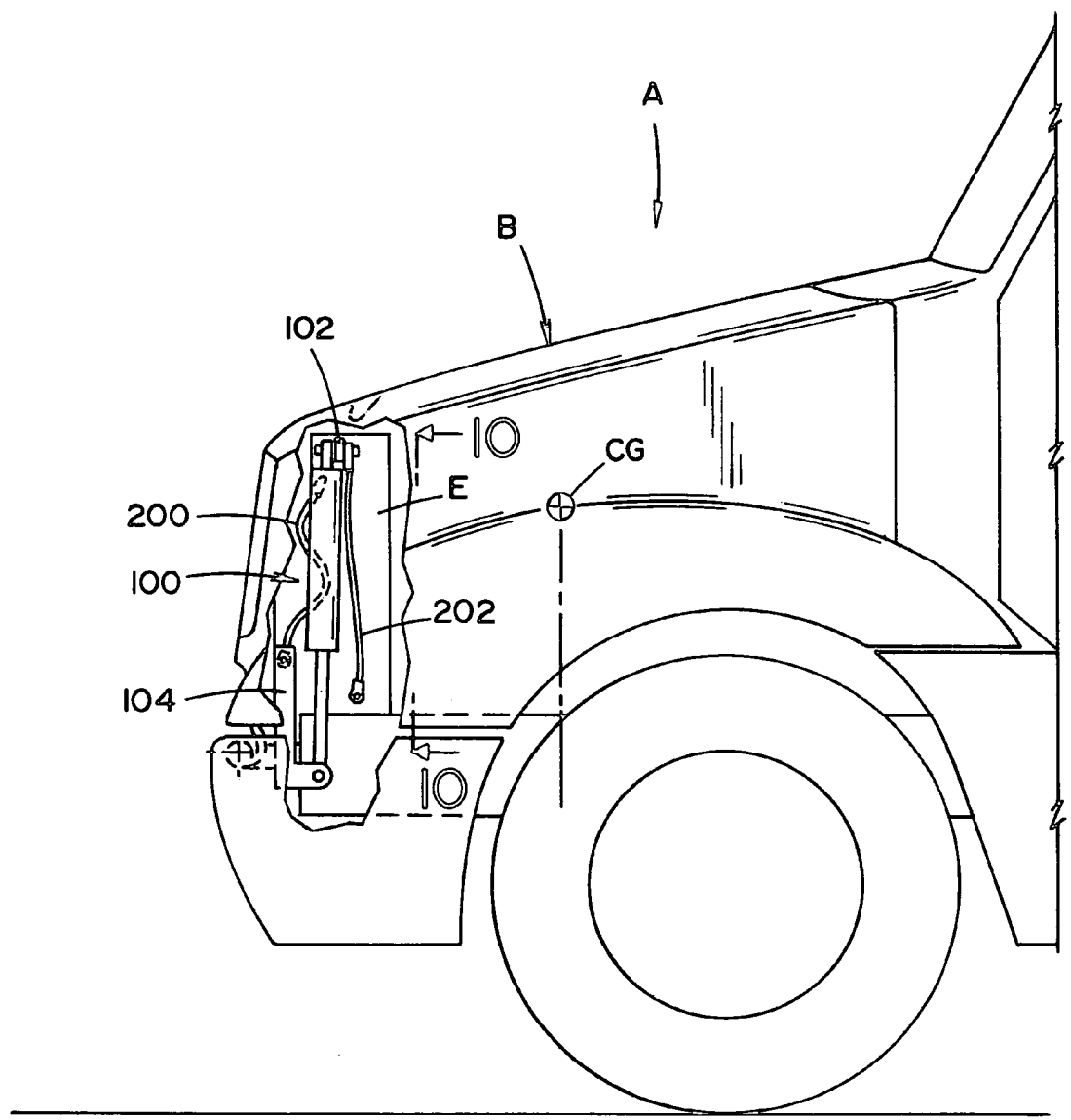
FIG. 8 illustrates a side elevational view of a strut assembly mounted to a hood of a vehicle in a fully closed position in accordance with a second preferred embodiment of the present invention.
Figure 10:
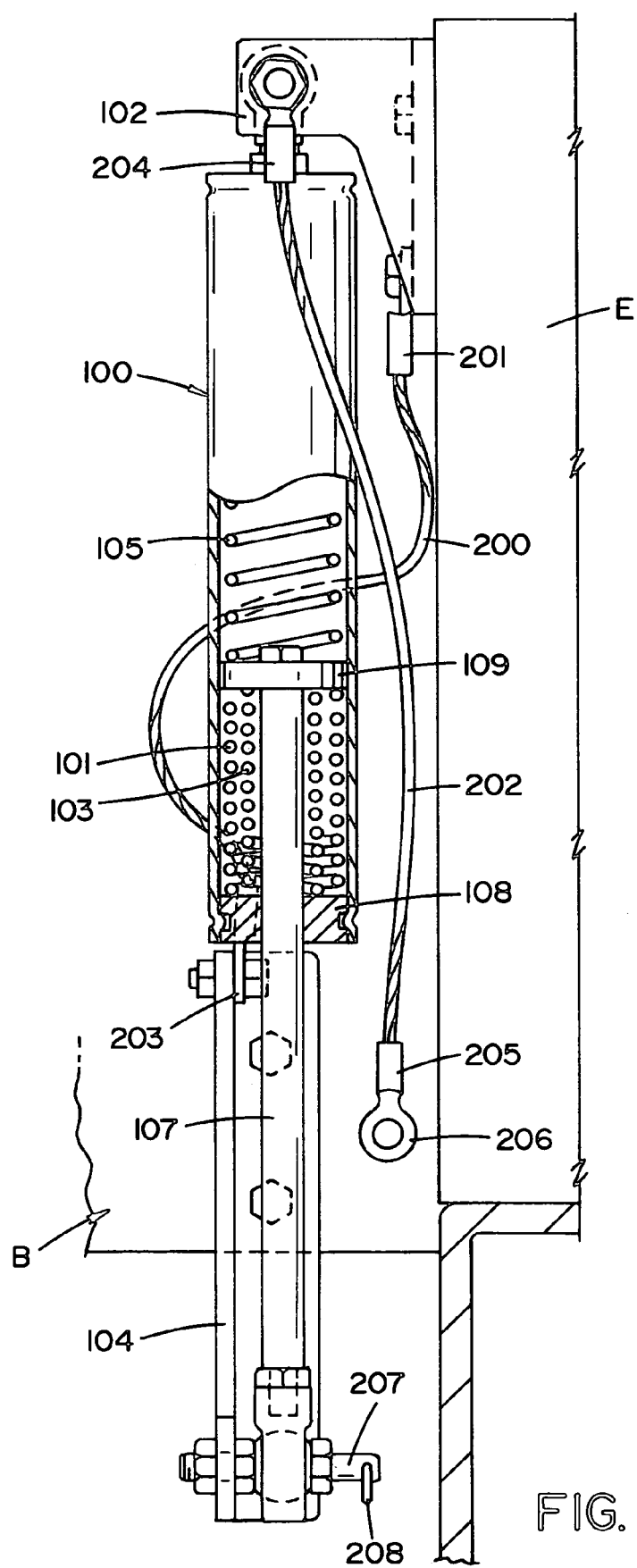
FIG. 10 is a side elevational view impartial cross-section of the strut assembly of FIG. 8 in a fully closed position of the hood.

The compression spring rod 107 through the spring-like characteristics of the compression springs 101, 103 serves to provide smooth extension forces to the movement of the rod from a retracted to an extended position thereof relative to housing 100. The compression springs can be fabricated from suitable spring material, such as music wire, and for example ASTM A228 or 302 stainless steel. The springs are captured between bushing 108 and plug 109. FIGS. 8 and 10 illustrate the first stage spring assembly in the compressed configuration.

Figure 9:
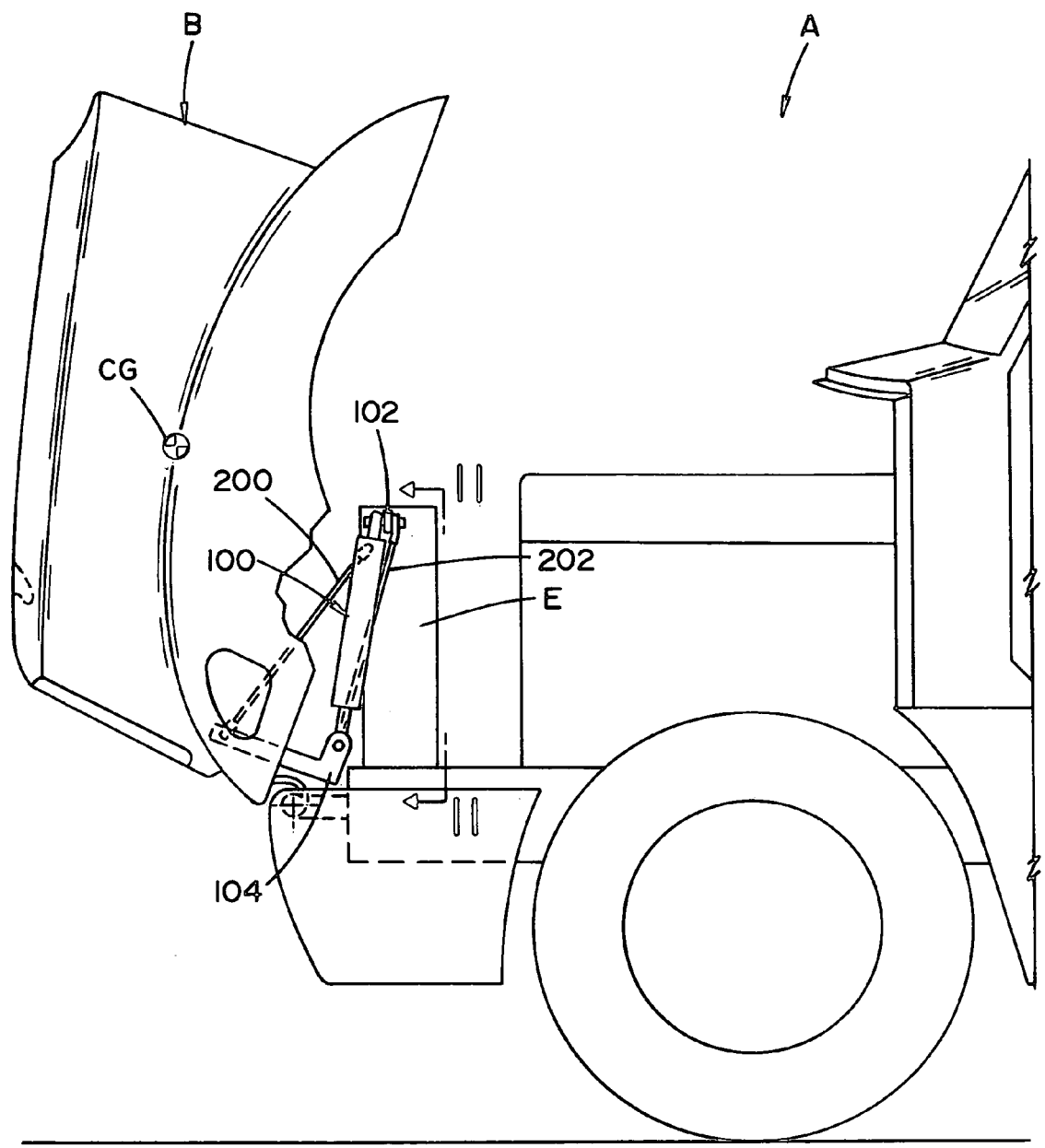
FIG. 9 is a side elevational view of the strut assembly and hood of FIG. 8 in a position balanced over the center of gravity of the hood.
Figure 11:
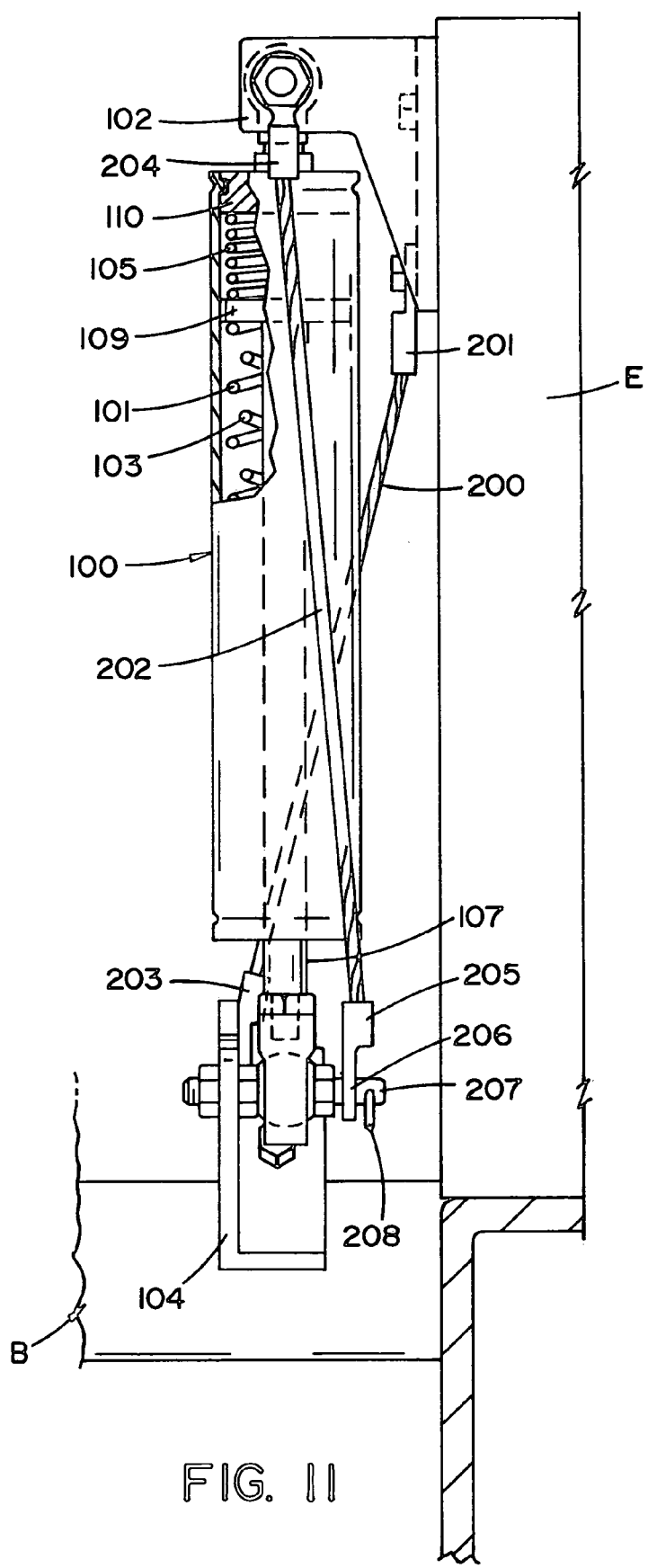
FIG. 11 is a side elevational view in partial cross section of the strut assembly of FIG. 8 in a fully opened position of the hood.

Referring now to FIGS. 9 and 11, a second stage spring assembly which is used to cushion the movement of the hood to the fully opened position, includes a single spring 105 which is positioned between guide plug 109 and bushing 110. As seen in FIG. 10, spring 105 is in the fully relaxed and extended position when the hood is in the fully closed position.

The embodiment of FIGS. 8 and 11 operates in a different fashion than the embodiment of FIGS. 1-6. That is, the first stage spring assembly, i.e. the springs that are compressed when the hood is in the fully closed position, is located below the second stage spring in FIGS. 8-11. Furthermore, the rod is fully extended in the hood closed position, and fully retracted in the hood open position.

Referring again to FIG. 8, the strut housing assembly 100 is mounted at one end to the hood assembly and is mounted at a second end to a radiator mount E. Referring to FIG. 11, a bracket 102 is used to mount the strut to the radiator. The bracket is bolted to or otherwise fastened to the radiator strut. A second bracket 104 is used to mount the strut onto the hood assembly B. The bracket 104 is preferably L-shaped, but other configurations can also be used.

A pair of restraining cables 200, 202 are provided to prevent the hood from traveling beyond the fully opened position shown in FIG. 9. The retracting cable can be nylon cords or any other suitable restraining device.

Referring now to FIG. 10, restraining cable 200 is secured at a first end 201 to the radiator strut and bracket 102 and at a second end 203 to bracket 104. The cable is secured via a bolt and nut arrangement in openings in the radiator bracket 102 and bracket 104.

FIGS. 8 and 10 illustrate the strut and hood assembly in the fully closed position. In this position, cables 200, 202 are slack. As the hood is opened to the fully opened position as shown in FIGS. 9 and 11, the cables each gradually tighten until substantially taut as shown in FIGS. 9 and 11. The cables help prevent the hood from traveling beyond the fully opened position, thus preventing potential injury to the user. That is, the strut is prevented from allowing the hood to travel beyond its fully opened position.

Referring to FIG. 10, cable 202 has a first end 204 secured to the upper bracket 102 and a lower, free end 205 which has a ring 206 which can be used to secure the second end to a pin 207 or the L-shaped bracket 104. A device pin 208 or another suitable device is used to secure the ring onto the pin 207.

Referring to FIGS. 8-11, the compression spring rod two stage assembly is schematically illustrated in the fully closed and fully opened positions. Referring to FIG. 10, the first stage compression spring assembly which comprises springs 101, 103 is shown to be in the compressed configuration. Second stage spring assembly 105 is shown to be in the fully extended or relaxed position. This configuration of the spring rod assembly corresponds to the hood in the fully closed position as shown in FIG. 8. As the hood is opened as illustrated in FIG. 9, the compression spring first stage spring assembly extends until the hood is in the balanced position over its center of gravity. At this point, the second stage spring is still being compressed. As soon as the hood extends past the center of gravity, gravity would tend to pull the hood downwardly and cause it to drop or fall in a rapid manner. To avoid this, the second stage spring 105 begins to be compressed by the guide plug 109 as seen in FIG. 11, thus slowing down the speed of movement of the hood to the fully opened position. In this configuration, the first stage spring assembly is in a fully extended position. The rod 107 extends further until the cables 200, 202 become taut, thus further preventing the hood from traveling beyond the open position.

As with the first embodiment, a second strut assembly is positioned on an opposite side of the vehicle which performs the same function. Unlike the first embodiment struts which are positioned approximately 4 degrees from vertical, the second embodiment strut is substantially vertical. The strut assembly of FIGS. 8-11 can also include a locking pin arrangement 33 as discussed for the embodiment of FIGS. 1-6. The other strut can also have one or both of the restraining cables 200, 202.

As can be seen in FIGS. 8 and 9, bracket 104 rotates in a counterclockwise manner as the hood pivots from a fully closed position in FIG. 8 to a fully opened position in FIG. 9. As the bracket rotates with the hood, the two straps become taut further preventing the hood from moving beyond its fully opened position. Bracket 102 remains stationary throughout movement of the hood.

Figure 12:
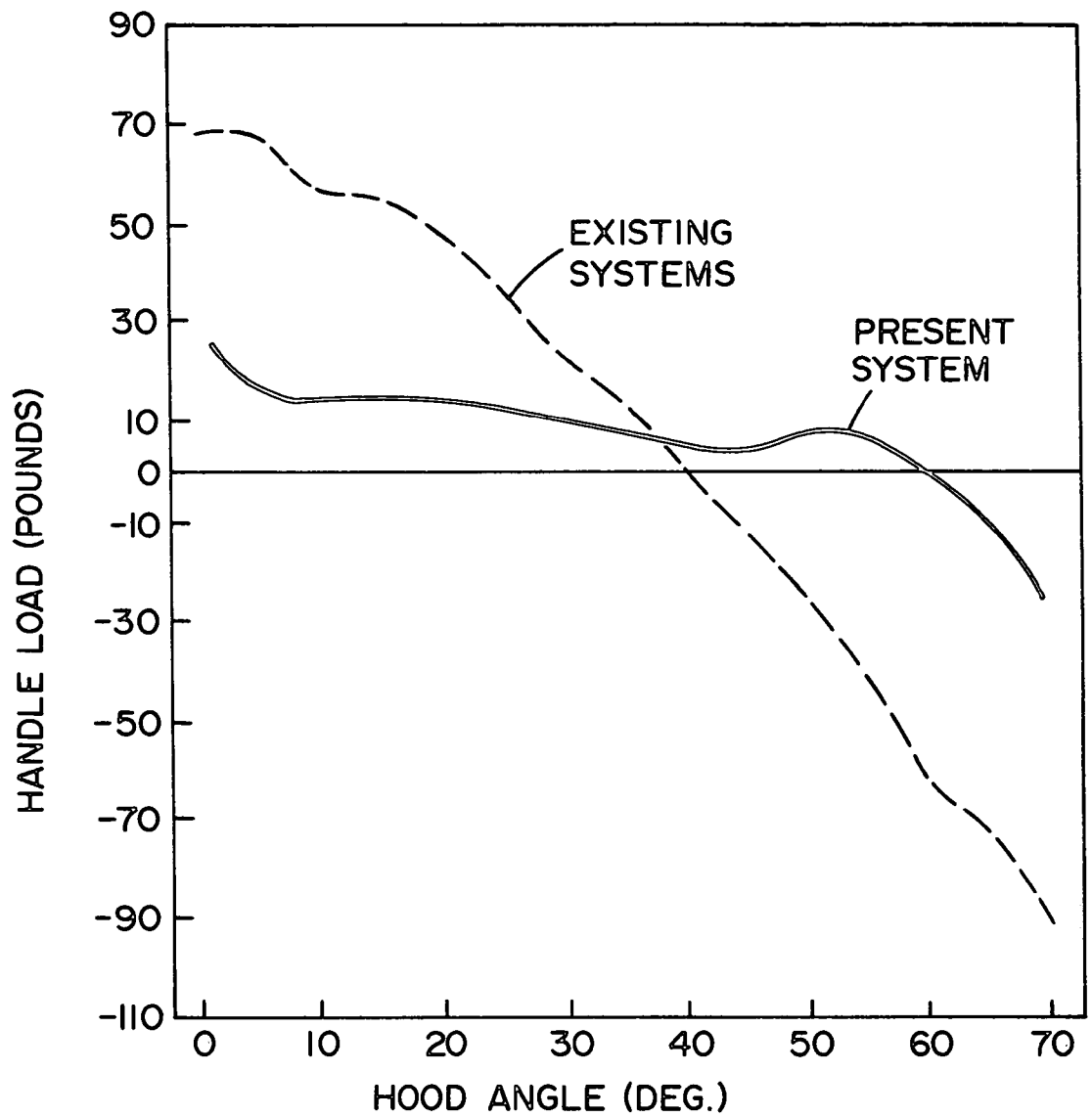
FIG. 12 is chart illustrating the handle load required to open and close the hood versus the hood angle.

Referring now to FIG. 12, a chart illustrates the amount of handle load required to lift the hood to a specific angle. The dotted line represents existing systems, while the solid line represents the present invention. As seen in FIG. 12, prior existing systems require up to 70 lbs. of handle load to open and close the hood. The present system requires less than 25 pounds of force to open and close the hood.

Another alternate embodiment of the strut assembly can have a first stage spring assembly which has two outer springs and a central, inner spring which is oppositely wound to the outer springs. The inner spring can provide greater strength in the spring assembly to provide greater resistance to closing the hood. The second stage spring assembly can also have two outer springs and an inner spring. As another alternative, both first stage and second stage springs can be single springs.

Referring to FIG. 13, yet another preferred embodiment of the strut assembly is shown. The strut 300 has a first compartment 302 filled with gas 304 such as a pressurized gas or hydraulic fluid, and a second compartment 306 housing a compression spring 308 and also containing gas 304. The gas serves to move piston 309 and piston rod 310 in a manner commonly known in the art and therefore will not be described in detail here. An example of the operation of a hydraulic strut is shown in U.S. Pat. No. 5,799,759.

The compression spring rod through the spring-like characteristics of the first-stage compression springs 308 serves to provide smooth extension forces to the movement of the rod from a retracted to an extended position thereof relative to the housing. The compression spring can be fabricated from suitable spring material, such as music wire, and for example ASTM A228 or 302 stainless steel. The spring is captured between the piston 309 and plug 312 located at one end of the housing 314. FIG. 13 illustrates the first stage spring assembly in the compressed configuration.

A second stage gas strut assembly which is used to cushion the movement of the hood to the fully opened position, includes a gas, such as pressurized gas or hydraulic fluid within chamber 302 to move the piston rod between the fully extended and retracted positions.

The first stage spring assembly, i.e. the spring 308 that is compressed when the hood is in the fully closed position, is located below the second stage gas strut in FIG. 13. Furthermore, the rod 310 is fully extended in the hood closed position, and fully retracted in the hood open position.

The strut assembly is mounted at one end 350 to the hood assembly and is mounted at a second end 352 to a radiator mount. A bracket 360 is used to mount the strut to the radiator. The bracket is bolted to or otherwise fastened to the radiator strut. A second bracket 380 is used to mount the strut onto the hood assembly. The bracket is preferably L-shaped, but other configurations can also be used.

A pair of restraining cables, such as cables 200, 202 shown in FIGS. 10 and 11, can be provided to prevent the hood from traveling beyond the fully opened position. The retracting cable can be nylon cords or any other suitable restraining device.

Alternately, a locking member similar to member 33 shown in FIGS. 5 and 6 can be used to prevent the rod from traveling beyond the fully opened position. Alternately, the first stage of the strut assembly can be the gas-filled chamber and the second stage can be the spring assembly. Also, the gas and spring combination can be used with the strut assembly of FIGS. 5 and 6 without departing from the scope of the invention.

Referring now to FIG. 14, a gas only strut 400 is shown. A piston rod 402 is used in which gas 404 is positioned on each side of the piston and is used to push piston 406 and the rod into a fully extended or fully retracted position. The gas can be pressurized gas or hydraulic fluid. The principle of operation of a gas piston strut is well known in the art and will not be discussed in detail here. An example of the operation of a hydraulic strut is shown in U.S. Pat. No. 5,799,759.

The strut 400 has a first compartment 408 filled with gas 404 such as nitrogen, and a second compartment 410 also filled with gas 404.

The second stage gas compartment 408 is used to cushion the movement of the hood to the fully opened position. The first stage gas compartment 410 is used to cushion movement of the hood to the fully closed position. The second stage assembly is located below the first stage assembly as shown in FIG. 14. However, a gas only strut assembly could also be used with the strut assembly illustrated in FIGS. 5 and 6. The gas is used to move the piston rod between fully opened and fully closed positions.

The rod is fully extended in the hood closed position, and fully retracted in the hood opened position. The strut housing assembly is mounted at one end 420 to the hood assembly and is mounted at a second end 430 to a radiator mount. A bracket 440 is used to mount the strut to the radiator. The bracket is bolted to or otherwise fastened to the radiator strut. A second bracket 450 is used to mount the strut onto the hood assembly. The bracket is preferably L-shaped, but other configurations can also be used.

A pair of restraining cables, such as cables 200, 202 shown in FIGS. 10 and 11, can be provided to prevent the hood from traveling beyond the fully opened position. The retracting cable can be nylon cords or any other suitable restraining device. Alternately, a locking member similar to member 33 shown in FIGS. 5 and 6 can be used to prevent the rod from traveling beyond the fully opened position.

While considerable emphasis has been placed herein on the structures and configurations of the preferred embodiments of the invention, it will be appreciated that other embodiments, as well as modifications of the embodiments disclosed herein, can be made without departing from the principles in the invention. In this respect, it will be appreciated that the spring rod can be used in applications other than those disclosed herein. Similarly, multiple combinations of coaxial and surrounding springs (i.e., 3, 4, etc.) may be configured to meet the desired load vs. deflections for a particular application. Likewise, it will be appreciated that the spring rod according to the invention can be secured to relatively displaceable components in any number of different ways. Furthermore, the use of a compression spring rod and the locking mechanisms described hereinabove can be used in other applications beyond a hood. These and other modifications of the preferred embodiments, as well as other embodiments of the invention, will be obvious and suggested to those skilled in the art from the disclosure herein, whereby it is to be distinctly understood that the foregoing descriptive matter is to be interpreted merely as illustrative of the present invention and not as a limitation thereof.

Having thus described the preferred embodiment, the invention is now claimed to be:

1. A strut assembly comprising a compression spring rod assembly, said compression spring rod assembly including a housing, a rod member, a guide member, a spring system and a locking arrangement, said housing having a cavity along a longitudinal axis of the housing, said housing including axially opposite first and second ends and a side wall extending therebetween, said cavity including at least a portion of a rod bushing that is secured at least closely adjacent to said first end of said housing, said rod member having a first and second ends, said rod member positioned at least partially in said cavity of said housing and having a longitudinal axis that is generally coaxial with said longitudinal axis of said housing, said rod member having a cross-section shape and a maximum cross sectional area that enable said rod member to move along said longitudinal axis of said housing without engaging an inner wall surface of said cavity of said housing, said rod member movable between a fully retracted and a fully extended position, said rod member having a length such that said first end of said rod member always extends through said rod bushing and beyond said first end of said housing as said rod member moves between said fully retracted and fully extended positions, said guide member positioned in said cavity and secured to said rod member, said guide member designed to support said rod member during movement of said rod member between said fully retracted and fully extended positions, said spring system located in said cavity of said housing, said spring system including a first spring arrangement positioned about a portion of said rod member and between said first end of said housing and said guide member and a second spring arrangement positioned between said guide member and said second end of said housing, said locking arrangement at least partially positioned on said housing, at least a portion of said locking arrangement positioned externally of said cavity and at least a portion of said locking arrangement positionable in said cavity that includes said first spring arrangement, at least a portion of said locking arrangement movable into said cavity via an opening in said side wall of said housing, said locking arrangement including an engagement member designed to engage said rod member in said cavity of said housing and to inhibit movement of said rod member when said engagement member engages said rod member.

2. The strut assembly as defined in claim 1, wherein said first spring arrangement includes a first mechanical spring positioned between said rod bushing and said guide member and said second spring arrangement includes a second mechanical spring positioned between said guide member and a tail bushing, said tail bushing positioned at least partially in said cavity and is secured at least closely adjacent to said second end of said housing.

3. The strut assembly as defined in claim 2, wherein said spring system includes a third mechanical spring positioned between said guide member and a tail bushing, said third mechanical spring having a coil diameter that is less than a coil diameter of said second mechanical spring, at least a portion of said third mechanical spring nested in said second mechanical spring.

4. The strut assembly as defined in claim 3, wherein said engagement member includes a locking pin and a biasing member, said biasing member designed to bias said pin into engagement with said rod member.

5. The strut assembly as defined in claim 4, wherein said first mechanical spring having a longitudinal length that is less than a longitudinal length of said cavity of said housing.

6. The strut assembly as defined in claim 5, wherein said rod member includes an engagement arrangement designed to engage at least a portion of said engagement member of said locking arrangement.

7. The strut assembly as defined in claim 2, wherein said first mechanical spring having a longitudinal length that is less than a longitudinal length of said cavity of said housing.

8. The strut assembly as defined in claim 3, wherein said rod member includes an engagement arrangement designed to engage at least a portion of said engagement member of said locking arrangement.

9. The strut assembly as defined in claim 3, including a mounting assembly positioned at least closely adjacent to said second end of said housing, said mounting assembly designed to releasably mount said housing to a structure external to said housing.

10. The strut assembly as defined in claim 9, wherein the external structure is a vehicle, said compression spring rod assembly designed to facilitate in opening and closing of a hood of the vehicle.

11. The strut assembly as defined in claim 10, wherein said first mechanical spring is designed to be partially compressed and said second mechanical spring is designed to simultaneously engage said tail bushing and said rod member when a hood of the vehicle is balanced over a center of gravity of the hood.

12. The strut assembly as defined in claim 1, wherein said engagement member includes a locking pin and a biasing member, said biasing member designed to bias said pin into engagement with said rod member.

13. The strut assembly as defined in claim 12, wherein said locking pin is movable in an axis that is perpendicular to said longitudinal axis of the housing, said locking pin including a grasping member at one end to enable a user to retract said pin from said rod member.

14. The strut assembly as defined in claim 13, wherein said locking pin includes a first and second member, said second member having a cross-sectional area that is greater than a cross-sectional area of said first member, said second member designed to engage said rod member.

15. The strut assembly as defined in claim 12, wherein said locking pin includes a first and second member, said second member having a cross-sectional area that is greater than a cross-sectional area of said first member, said second member designed to engage said rod member.

16. The strut assembly as defined in claim 1, wherein said rod member includes an engagement arrangement designed to engage at least a portion of said engagement member of said locking arrangement.

17. The strut assembly as defined in claim 16, wherein said engagement arrangement on said rod member enables said engagement member of said locking arrangement to inhibit movement of said rod member when said rod member is in said fully extended position.

18. The strut assembly as defined in claim 16, wherein said engagement arrangement includes a slot or groove.

19. The strut assembly as defined in claim 1, including a mounting assembly positioned at least closely adjacent to said second end of said housing, said mounting assembly designed to releasably mount said housing to a structure external to said housing.

20. The strut assembly as defined in claim 19, wherein the external structure is a vehicle, said compression spring rod assembly designed to facilitate in opening and closing of a hood of the vehicle.

21. The strut assembly as defined in claim 1, wherein at least a portion of said locking arrangement is positioned in said cavity of said housing.

22. A strut assembly comprising a compression spring rod assembly, said compression spring rod assembly including a housing, a rod member, a guide member, a spring system and a locking arrangement, said housing having a cavity along a longitudinal axis of the housing, said housing including axially opposite first and second ends and a side wall extending therebetween, said cavity including at least a portion of a rod bushing that is secured at least closely adjacent to said first end of said housing, said rod member having first and second ends, said rod member positioned at least partially in said cavity of said housing and having a longitudinal axis that is generally coaxial with said longitudinal axis of said housing, said rod member having a cross-section shape and a maximum cross sectional area that enable said rod member to move along said longitudinal axis of said housing without engaging an inner wall surface of said cavity of said housing, said rod member movable between a fully retracted and a fully extended position, said rod member having a length such that said first end of said rod member always extends through said rod bushing and beyond said first end of said housing as said rod member moves between said fully retracted and fully extended positions, said guide member positioned in said cavity and secured to said rod member, said guide member designed to support said rod member during movement of said rod member between said fully retracted and fully extended positions, said spring system located in said cavity of said housing, said spring system including a first spring arrangement positioned between said rod bushing and said guide member and a second spring arrangement positioned between said guide member and said second end of said housing, said locking arrangement at least partially positioned on said housing, at least a portion of said locking arrangement positioned externally of said cavity and at least a portion of said locking arrangement is positionable in said cavity, at least a portion of said locking arrangement is movable into said cavity via an opening in said side wall of said housing, said locking arrangement including an engagement member designed to engage said rod member in said cavity of said housing and to inhibit movement of said rod member, said rod bushing including a side cavity designed receive at least a portion of said engagement member when said engagement member moves into engagement with said rod member.

23. The strut assembly as defined in claim 22, wherein at least a portion of said side cavity is in alignment with said opening in said side wall of said housing.

24. The strut assembly as defined in claim 23, wherein said engagement member includes a locking pin and a biasing member, said biasing member designed to bias said pin into engagement with said rod member.

25. The strut assembly as defined in claim 24, wherein said first mechanical spring having a longitudinal length that is less than a longitudinal length of said cavity of said housing.

26. The strut assembly as defined in claim 25, wherein said rod member includes an engagement arrangement designed to engage at least a portion of said engagement member of said locking arrangement.

27. The strut assembly as defined in claim 26, wherein said engagement arrangement on said rod member enables said engagement member of said locking arrangement to inhibit movement of said rod member when said rod member is in said fully extended position.

28. The strut assembly as defined in claim 27, including a mounting assembly positioned at least closely adjacent to said second end of said housing, said mounting assembly designed to releasably mount said housing to a structure external to said housing.

29. The strut assembly as defined in claim 28, wherein the external structure is a vehicle, said compression spring rod assembly designed to facilitate in opening and closing of a hood of the vehicle.

30. The strut assembly as defined in claim 29, wherein said first mechanical spring is designed to be partially compressed and said second mechanical spring is designed to simultaneously engage said tail bushing and said rod member when a hood of the vehicle is balanced over a center of gravity of the hood.

31. The strut assembly as defined in claim 30, wherein at least a portion of said locking arrangement is positioned in said cavity of said housing.

32. The strut assembly as defined in claim 31, wherein at least a portion of said locking arrangement is positioned in said side cavity of said rod bushing.

33. The strut assembly as defined in claim 23, including a mounting assembly positioned at least closely adjacent to said second end of said housing, said mounting assembly designed to releasably mount said housing to a structure external to said housing.

34. The strut assembly as defined in claim 33, wherein the external structure is a vehicle, said compression spring rod assembly designed to facilitate in opening and closing of a hood of the vehicle.

35. The strut assembly as defined in claim 22, wherein said engagement member includes a locking pin and a biasing member, said biasing member designed to bias said pin into engagement with said rod member.

36. The strut assembly as defined in claim 35, wherein said first mechanical spring having a longitudinal length that is less than a longitudinal length of said cavity of said housing.

37. The strut assembly as defined in claim 36, wherein said rod member includes an engagement arrangement designed to engage at least a portion of said engagement member of said locking arrangement.

38. The strut assembly as defined in claim 22, wherein said rod member includes an engagement arrangement designed to engage at least a portion of said engagement member of said locking arrangement.

39. The strut assembly as defined in claim 22, wherein at least a portion of said locking arrangement is positioned in said cavity of said housing.

40. The strut assembly as defined in claim 22, wherein at least a portion of said locking arrangement is positioned in said side cavity of said rod bushing.

* * * * *